United States Patent [19]

Schmidt et al.

[11] Patent Number: 5,025,866
[45] Date of Patent: Jun. 25, 1991

[54] ROW FOLLOWING DRAWN IMPLEMENT WITH INTERNAL STEERING ARM

[75] Inventors: Eugene H. Schmidt, Lexington; Lee F. Nikkel, Madrid, both of Nebr.

[73] Assignee: New Tek Manufacturing, Inc., North Platte, Nebr.

[21] Appl. No.: 533,018

[22] Filed: Jun. 4, 1990

[51] Int. Cl.$^5$ .................. A01B 63/00; A01B 23/06
[52] U.S. Cl. ................................ 172/5; 172/190; 180/131
[58] Field of Search .................. 172/5, 6, 26, 233; 104/244.1; 171/8; 364/424.07; 280/776; 318/587; 180/131

[56] References Cited

U.S. PATENT DOCUMENTS

| | | | |
|---|---|---|---|
| 3,512,587 | 5/1970 | Shader | 172/6 |
| 4,031,962 | 6/1977 | Ellinger | 171/8 |
| 4,418,763 | 12/1983 | Boetto | 172/456 |
| 4,607,716 | 8/1986 | Beck | 104/244.1 |
| 4,640,365 | 2/1987 | Schmidt | 172/26 |
| 4,923,017 | 5/1990 | Meek et al. | 172/456 |
| 4,930,581 | 6/1990 | Fleischer et al. | 172/6 |

OTHER PUBLICATIONS

Fleischer Manufacturing Inc., Scout Guidance System, Advertisement.

Primary Examiner—Dennis L. Taylor
Assistant Examiner—Spencer Warnick
Attorney, Agent, or Firm—John A. Beehner

[57] ABSTRACT

A row following drawn implement includes a transversely extended implement frame and an elongated hitch arm having a forward end adapted for connection to a towing vehicle and a rearward end connected to the frame for pivotal movement about an upright pivotal axis adjacent the rearward end of the hitch arm. A power source interconnects the frame and hitch arm for pivoting the hitch arm about its pivot axis. The power source is housed substantially within the confines of the frame to avoid interference with the mounting of tools and other equipment on the frame. A row follower senses transverse movement of the implement relative to a ground row being followed and is operatively associated with the power source to cause corrective steering movement of the implement frame relative to the hitch arm.

18 Claims, 3 Drawing Sheets

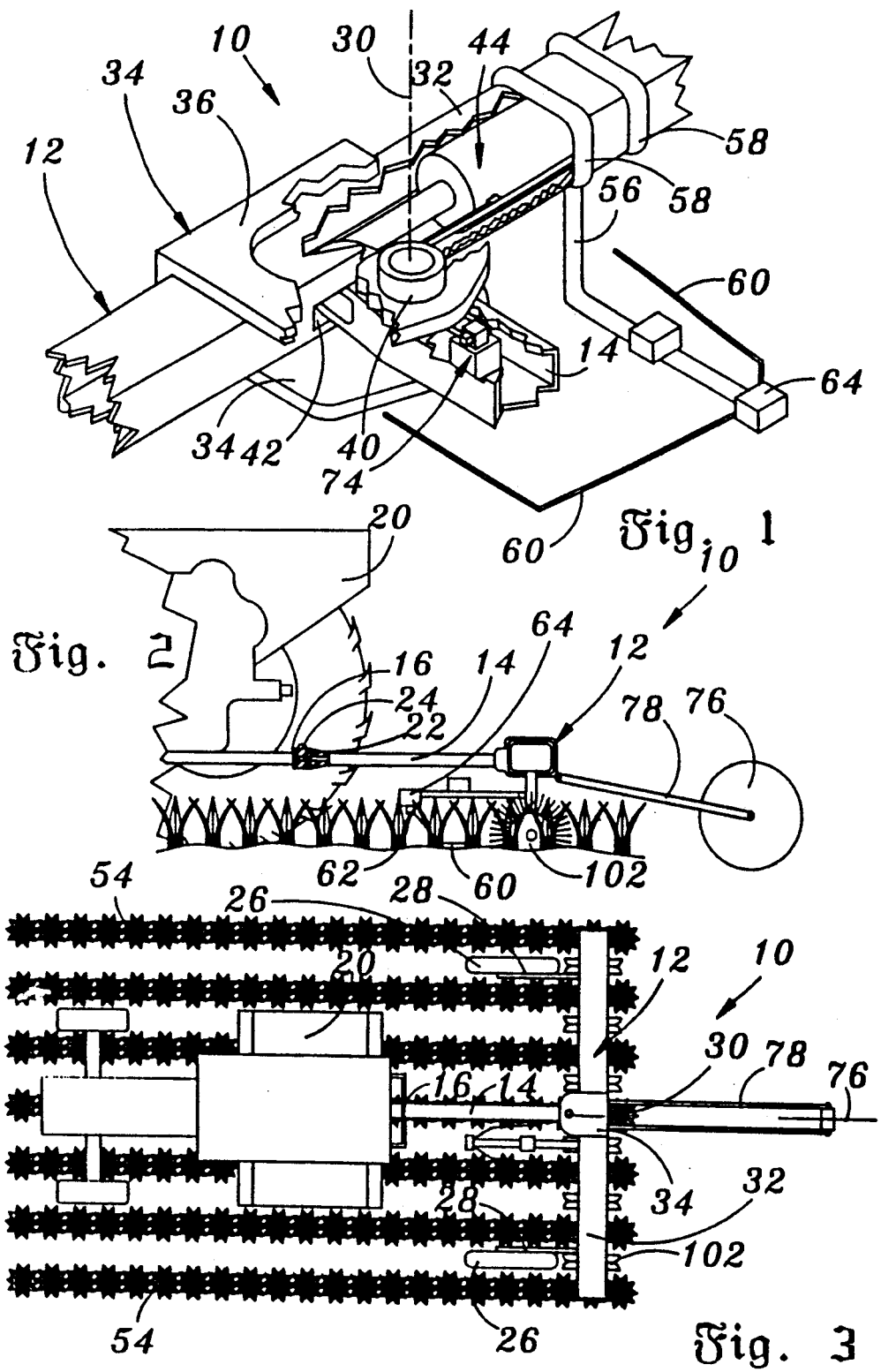

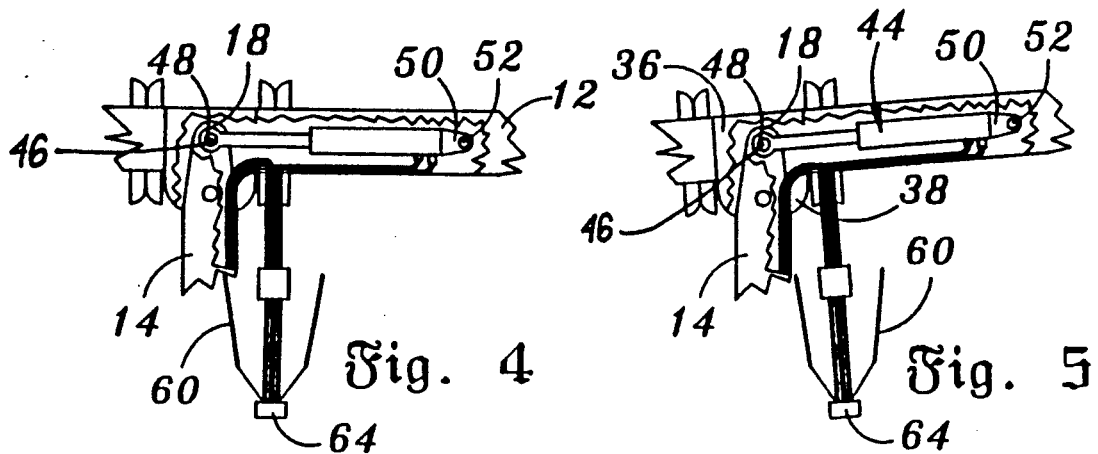
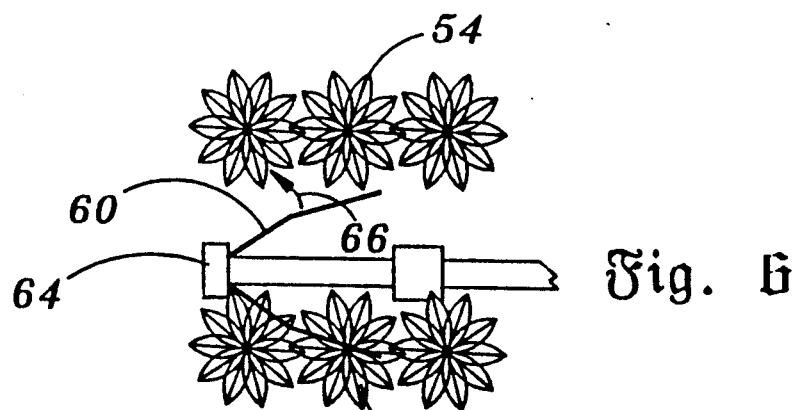
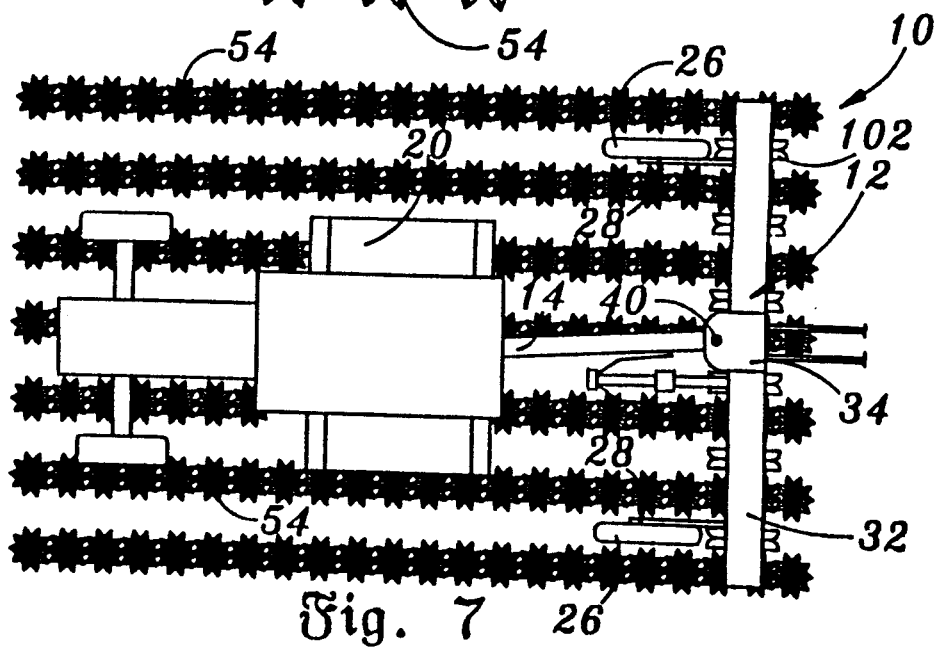

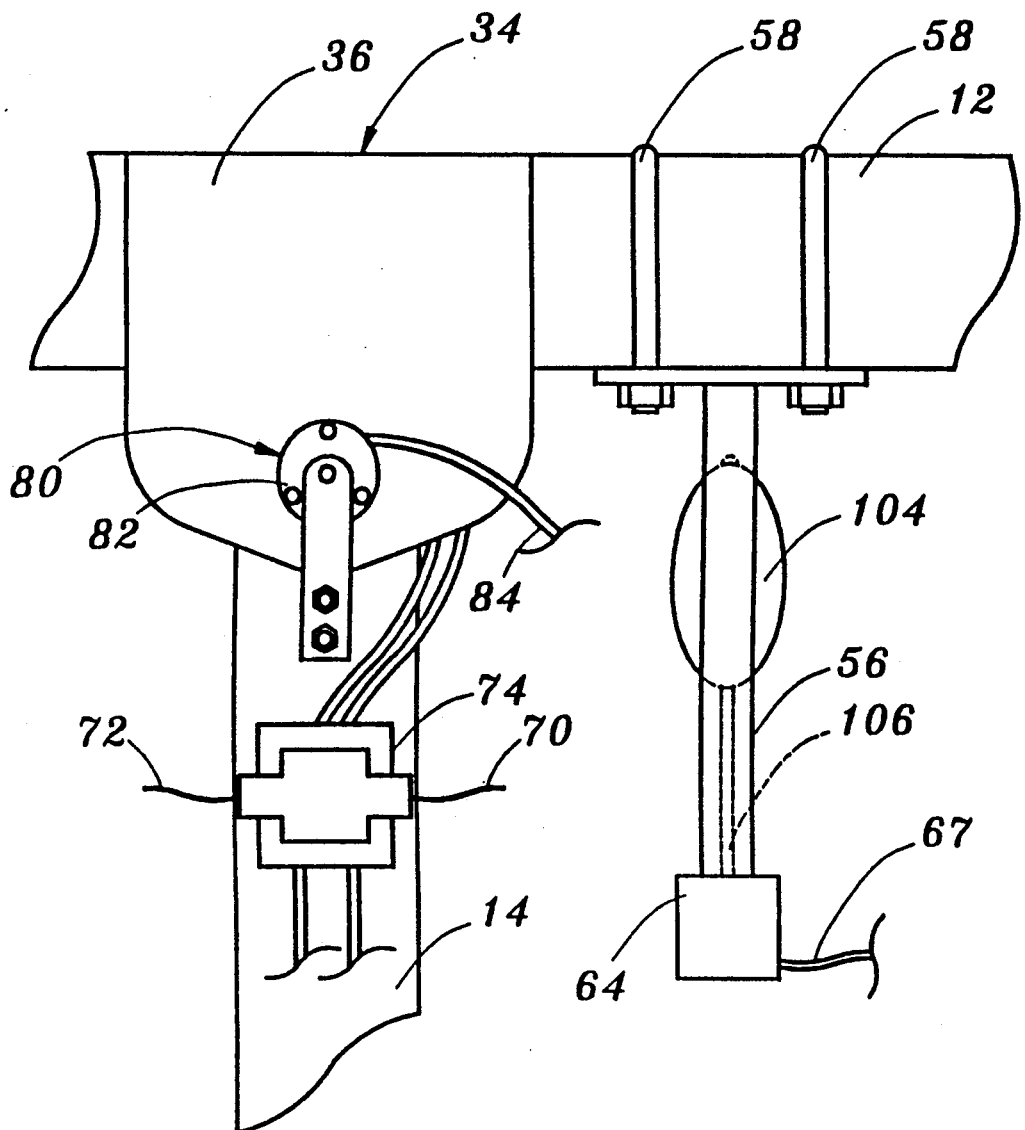
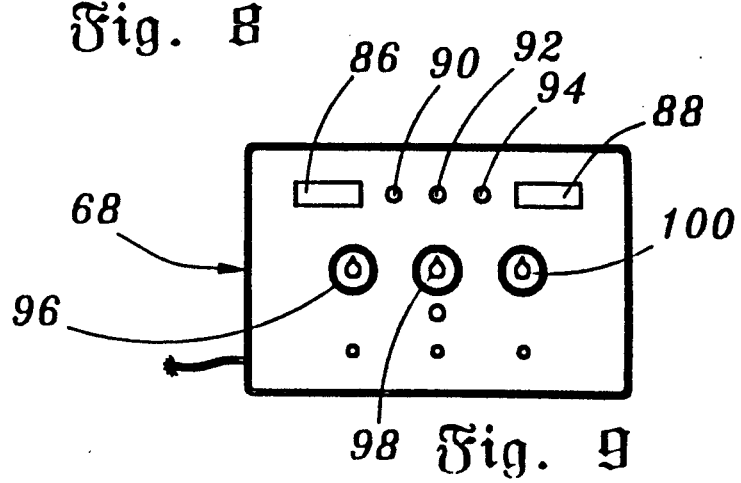

ROW FOLLOWING DRAWN IMPLEMENT WITH INTERNAL STEERING ARM

BACKGROUND OF THE INVENTION

The present invention is directed generally to a drawn implement equipped with an internal steering cylinder and steering arm for corrective steering of the implement when the towing vehicle becomes offset relative to a ground row because of driver fatigue or any other reason.

It has long been a problem in the operation of farm equipment to guide implements through a crop field without accidentally deviating from the crop rows and destroying planted crops. Some agricultural implements carry ground working tools spaced as close as four inches (4") apart. The tractor operator is generally situated in a cab located several feet above and forwardly of the implement where it may be difficult to view the actual engagement of the tools with the ground. Thus the operator must simply attempt to keep the tractor centered relative to the crop rows.

The problem of maintaining the ground working tools between the crop rows becomes critical in an operation, such as cultivating, where a slight lateral misalignment of the tractor relative to the crop rows will cause the implement to uproot several rows of crops. The problem is compounded by the great width of modern cultivators capable of working as many as sixteen (16) or more rows. Furthermore, as the operator spends many hours in the field, fatigue makes it increasingly difficult to constantly maintain proper steering of the tractor. In the small amount of time it takes to turn from observing the implement to looking forward to align the tractor in the row, several feet of crops in multiple rows can be uprooted.

For three-point hitch mounted implements, a row following guidance device has been disclosed in Schmidt U.S. Pat. No. 4,640,365, which provides a row following wheel or other sensor for detecting transverse movement of the implement relative to a crop row. The sensor is connected to a pair of hydraulic cylinders for pivoting the implement tool bar about an imaginary central vertical axis for corrective steering of the implement to maintain its proper position even when the tractor becomes offset relative to crop rows. Such a guidance device is commercially available from Sunco Marketing of North Platte, Nebr., under the ACURA-TRAK trademark. Because that device effectively accomplishes a shortening and lengthening of the two lower links of a three-point hitch connection to a tractor, it is inapplicable for drawn implements having a tongue adapted for connection to the drawbar of a tractor.

Previous attempts to afford corrective steering for drawn implements have all had certain shortcomings which limit their usefulness. For example, Titzmann, East German Patent No. 55,168, discloses an implement having a hitch arm pivotally connected to the implement with a hydraulic cylinder extending between the implement and a medial position of the hitch arm. The external connection of the hydraulic cylinder to the tool bar of the implement limits the positions along the tool bar at which ground working tools can be mounted, rendering the implement inoperative for certain tool placements. A similar hydraulic cylinder and hitch bar arrangement is disclosed in Beck, U.S. Pat. No. 4,607,716, wherein an auxiliary U-shaped frame extends forwardly of the tool bar for pivotal connection to the hitch arm. Schmidt U.S. Pat. No. 3,326,319, discloses an implement having a special articulated hitch arm with an external cylinder 14 to afford pivotal movement between the parts of the hitch arm. Finally, Collogan, U.S. Pat. No. 4,180,133, discloses another two-part articulated hitch arm requiring a double connection to the drawbar by both the forward portion of the hitch arm and a hydraulic cylinder having its other end connected to a brace on the side of the hitch arm. That cylinder, however, effects pivotal movement of the hitch arm relative to the tractor drawbar, leaving the implement frame freely pivotable relative to the opposite end of the hitch arm.

Perhaps the most significant use of the present invention will be on drawn agricultural planter implements. For ridge planting in particular, it is critical that the planter units follow the tops of the ridges to assure proper seed placement. To compensate for inevitable driver fatigue, a guidance system is required which can follow the old furrows and effect corrective steering of the planter implement to maintain its proper position even if the tractor varies somewhat from its intended path.

Proper implement placement relative to crop rows is particularly important for contour farming where the crop rows follow the edge of a terrace or extend around a hill. On the first pass along a contour, a cutter wheel makes a furrow that must be precisely followed by the planter on the next pass if uniform spacing between crop rows is to be maintained. Similar guidance is needed for following the furrow of an even row marker.

A primary object of the invention, therefore, is to provide a drawn implement with a guidance system capable of effecting pivotal steering movement of the implement frame relative to the hitch arm without interference with the mounting of tools on the implement frame.

Another object of the invention is to provide such a guidance system wherein the power source for effecting pivotal movement of the hitch arm is substantially concealed within the implement frame.

Another object is to provide such an implement wherein the pivotal connection between the hitch arm and power source is situated rearwardly of the pivotal connection of the implement frame to the hitch arm.

Another object is to provide a drawn implement with a guidance system which is simple and rugged in construction, economical to manufacture and efficient in operation.

SUMMARY OF THE INVENTION

The row following implement of the invention includes a transversely extended implement frame and an elongated hitch arm having a forward end adapted for connection to a towing vehicle and a rearward end connected to the frame for pivotal movement about an upright pivot axis adjacent the rearward end of the hitch arm. A power source is carried on the frame and operatively connected between the hitch arm and frame for pivoting the hitch arm about its pivot axis. The power source is housed substantially within the confines of the frame to avoid interference with the mounting of tools or other equipment on the frame. A row follower is carried on the implement and is operative to sense transverse movement of the implement relative to a ground row. A row follower is operatively connected to the power source for actuating it to effect pivotal steering movement of the frame relative to the hitch arm in response to transverse movement of the implement relative to a ground row.

For an agricultural drawn implement, the implement frame is likely to be a transversely extended tool bar. It is preferred that the pivot axis for the hitch arm intersect the hitch arm forwardly of its rearward end with the power source being connected to the hitch arm rearwardly of the pivot axis. This arrangement is facilitated by providing the tool bar as an elongated main tubing member with mounting flanges extended forwardly therefrom at a position generally centered on the tubing member so that the hitch arm pivot axis intersects the mounting means forwardly of the main tubing member. The power source may be an extendable and retractable hydraulic cylinder situated within the main tubing member substantially parallel to the longitudinal axis thereof.

More stable guidance control is effected if the implement is equipped with a ground engaging stabilizer disc supported for rotation about a transverse pivot axis at a position rearwardly of the tool bar. A feedback sensor may be provided at the pivotal connection between the hitch arm and frame for sensing the relative pivotal position of the hitch arm relative to the tool bar. An electrical control box in the tractor cab is equipped with gauges showing the positions of the row follower and implement as well as control knobs for adjusting centering, sensitivity and feedback for the guidance system.

BRIEF DESCRIPTION OF THE DRAWINGS

FIG. 1 is a foreshortened and partial perspective view, with portions broken away, showing the pivotal connection of the hitch arm to the tool bar of an agricultural drawn implement of the invention;

FIG. 2 is a side elevational view of the implement being towed behind a tractor;

FIG. 3 is a top plan view of the implement being towed by a tractor properly aligned with the crop rows.

FIG. 4 is a partial top plan view, with portions broken away for clarity, showing the hitch arm connected to the tool bar at a perpendicular angle thereto;

FIG. 5 is a partial top plan view, with portions broken away for clarity, showing the hydraulic cylinder partially retracted to effect pivotal movement of the tool bar relative to the hitch arm;

FIG. 6 is a partial detail top plan view showing operation of the wand-type row follower;

FIG. 7 is a top plan view of the implement being steered to maintain its proper position relative to the crop rows with the tractor laterally offset from its intended path;

FIG. 8 is a partial top plan view showing the electrical and hydraulic controls for the guidance system of the invention;

FIG. 9 is a diagrammatic front view of the face of the control box in the cab of the tractor.

DESCRIPTION OF THE PREFERRED EMBODIMENT

The row following drawn implement 10 of the invention is illustrated in the drawings as including an elongated frame or tool bar 12 and a forwardly extending hitch arm 14 having forward and rearward ends 16 and 18. The forward end 16 of hitch arm 14 is adapted for connection to a towing vehicle such as the tractor 20 in FIG. 2. Accordingly, the forward end of the hitch arm may be provided with a clevis connector 22 for attachment to the tractor drawbar by a pin 24.

Referring to FIG. 3, the implement 10 is self supporting on its own ground wheels 26 which are rotatably mounted on the ends of wheel support arms 28 mounted On tool bar 12. Thus implement 10 generally designates a drawn type implement, as opposed to a three-point hitch implement which may be fully supported on the tractor.

Whereas most drawn implements have a tongue or hitch arm which is rigidly connected to the frame or tool bar with no steering of the hitch arm relative to the tool bar, hitch arm 14 is pivotally connected to tool bar 12 for transverse pivotal movement about a generally upright pivot axis 30 adjacent to the rearward end 18 of hitch arm 14. For this purpose, the tool bar is considered to include an elongated main tubing member 32 and a generally U-shaped mounting bracket 34 fixed to the tool bar and having upper and lower forwardly projected flanges 36 and 38 through which a hitch pin 40 extends. Thus the pivot axis 30, through hitch pin 40, intersects the hitch arm 14 forwardly of the rearward end 18 thereof as clearly shown in FIGS. 4 and 5. The rearward end 18 of hitch arm 14 extends through an opening 42 through the front of tool bar 12 for pivotal connection to an extendable and retractable power means 44 situated substantially within the confines of tool bar 12 as shown in FIGS. 1, 4, and 5. Whereas the power means 44 is illustrated as a double acting hydraulic cylinder, it could alternately be a hydraulic or electric motor for even a mechanical linkage connected to such a cylinder or motor. In the illustrated embodiment, a pivot pin 46 connects the rearward end 18 of hitch arm 14 to the rod end 48 of hydraulic cylinder 50, the cylinder end of which is pivotally connected to the tool bar 12 at 52. As can be seen in FIGS. 4 and 5, retraction of hydraulic cylinder 50 causes pivotal steering movement of the tool bar 12 from its perpendicular position of FIG. 4 relative to hitch arm 14 to the inclined position indicated in FIG. 5. Similarly, extension of hydraulic cylinder 50 results in pivotal steering movement of the tool bar in the opposite direction. Thus, the power means that is connected to the rearward end of the hitch arm is capable of effecting a steering movement of the tool bar relative to the tractor 20 for maintaining any tools on the tool bar in proper alignment with crop rows even when the tractor becomes misaligned with the crop rows due to operator fatigue or whatever other reason.

To properly actuate the hydraulic cylinder 50, it is therefore necessary to sense the relative transverse position of tool bar 12 relative to crop rows indicated generally at 54 in FIGS. 6 and 7. For this purpose, a mounting arm 56 is connected to the tool bar 12 by a pair of clamps 58 or any other suitable means. Mounting arm 56 preferably extends downwardly and forwardly from the tool bar for pivotal connection to a row follower device. One such device includes a pair of crop engaging wire wands 60, as illustrated in FIGS. 1, 2 and 6, wherein the wands extend downwardly and rearwardly from a pivot shaft 62 protruding from the underside of a housing 64. When the tool bar is properly centered relative to the crop rows, the spaced apart wands fit between the adjacent rows, such that the pivot shaft 52 remains stationary as the implemented advances across a field. Upon transverse movement of the tool bar toward one crop row as illustrated in FIG. 6, the adjacent wand 60 engages that crop row causing the wands and pivot shaft 62 to rotate in the direction of arrow 66 in FIG. 6. Pivotal movement of shaft 62 relative to housing 64 is detected by a conventional sensor within housing 64 and electrically communicated through wire 67 through a control box 68, preferably positioned within the cab of tractor 20.

In the illustrated embodiment, the control box 68 reacts by directing a signal through wires 70 and 72 (FIG. 8) to cause adjustment of an electrically actuated hydraulic four-way valve 74 to cause hydraulic fluid to retract hydraulic cylinder 50 to produce a counter-clockwise steering movement of tool bar 12 relative to hitch arm 14 as illustrated in FIGS. 5 and 7. Steering movement of the tool bar is dampened by a stabilizer disc 76 which may be rotatably mounted on a horizontal pivot shaft carried by stabilizer arms 78 which extend rearwardly from tool bar 12. As steering movement of the tool bar 12 causes it to return to its properly aligned position between the crop rows, that corrective movement is sensed by the wands 60 which thereby cause opposite rotation of pivot shaft 62 so that a signal from sensor 64 is directed through control box 68 to valve 74 for readjusting the angle between the tool bar and hitch arm for maintaining the tool bar in its proper position relative to the crop rows.

Referring to FIG. 8, the relative pivotal position of the tool bar 12 relative to hitch arm 14 is continuously sensed by feedback sensor 80 on the hitch arm mounting bracket 34. In one type of sensor, a magnet on a disc within sensor housing 82 pivots with the tool bar relative to a stationary sensor on hitch arm 14. The resulting signal is directed to the control box through wire 84.

The control box 68 may include a pair of bar graphs 86 and 88 which are respectively connected to sensors 64 and 80 for indicating the positions of wands 60 and tool bar 12 respectively. Between the bar graphs there is a lamp 90 for signaling left output, a center on-off lamp 92 and a right lamp 94 for indicating right output. Three control knobs are provided including a centering knob 96, a sensitivity knob 98 and a feedback knob 100. The centering knob is for the purpose of fooling the wand sensor to move the machine toward one side or the other when the machine is biased in one direction such as when traversing a slope. The sensitivity knob 98 adjusts the degree of rotation of pivot shaft 62 that will result in actuation of hydraulic cylinder 50. Finally, feedback knob 100 is rotatable clockwise to reduce feedback from the sensor 80. It is desirable to eliminate feedback at times depending on how the implement tools are configured. All three knobs are connected to conventional potentiometers.

In operation, when the tractor 20 and implement 10 are properly aligned relative to crop rows as illustrated in FIG. 3, the pivotal position of the tool bar 12 remains fixed relative to hitch arm 14. In response to transverse movement of the tool bar 12 relative to the crop rows, however, due to either curves in the crop rows or mis-steering of the tractor, the wands 60 engage the crop row toward which the implement is moved, thereby rotating the pivot shaft within sensor housing 64 and directing a signal through control box 68 to the hydraulic four-way valve 74 to effect pivotal steering movement of the tool bar 12 for realigning it relative to the crop rows. As the tool bar becomes realigned relative to the crop rows, wands 60 rotate in the opposite direction to return the pivot shaft 62 toward its neutral position, which rotation causes a signal to be directed through control box 68 to hydraulic valve 74 for again actuating hydraulic cylinder 50 to rotate the tool bar 12 back toward its perpendicular position of FIG. 4 relative to the hitch arm 14.

The sensing devices 64 and 80 are very sensitive so the angles illustrated in FIGS. 5 and 7 are exaggerated. In response to a small predetermined offset of the implement from its desired position relative to the crop rows, the tool bar is slightly pivoted for immediate corrective steering action so that the steering angle illustrated in FIG. 5 may never be necessary.

The implement 10, as shown in FIGS. 2 and 3, is a simplified representation of a plurality of ground working tools 102 mounted on the tool bar 12 in spaced apart relation for working the ground between crop rows. A most frequent application of the steering arm feature of the invention may be for agricultural planter implements. The ground wheel support arms 28 may be pivotally connected to the tool bar for raising the tool bar and moving the wheels beneath it for transport between fields and over the road. It is apparent that the steering concept of the invention is applicable for the full range of drawn type implements used in agriculture, construction and industry. Whereas the frame to which the hitch arm 14 is connected is shown as a tool bar in the drawings, it is understood that the frame could have a significantly different structure even in the agricultural field, such as for an anhydrous tank implement.

It is an important feature of the invention that the hydraulic cylinder 50 or other power source or linkage that causes steering movement of the hitch arm 14 be situated substantially within the confines of the frame. In the example of the main tubing member 32 shown in FIG. 1, it is contemplated that the power source or linkage to the power source be situated within the tubing member so as not to interfere with placement of tools at most positions along the tool bar. For a tool bar of C-channel or I-beam construction, "substantially within the confines of said frame" contemplates placement between the flanges extending outwardly from the web so as to avoid interference with the attachment of tools or other structure along the length of the tool bar. On other shaped frames, "substantially within the confines of said frame" contemplates placement at a position such that the power means is substantially enclosed by portions of the frame and a plane across an adjacent opening in the frame. In other words it is not critical that the power source be completely surrounded or enclosed. It simply should not extend in any direction substantially beyond an adjacent portion of the frame. The object is to avoid interference with the attachment of tools or other accessories to the frame.

Whereas the invention has been shown and described in connection with a preferred embodiment thereof, it is apparent that many modifications, substitutions and additions may be made which are within the intended broad scope of the appended claims. For example, if the row being followed is a furrow instead of rows of planted crops, the somewhat football shaped sled 104 of FIG. 8 may be connected by an arm 106 to the pivot shaft 62 of sensor housing 64 in place of the wands 60. Other row following devices such as wheels or electronic, magnetic or visual sensors may be substituted where applicable. It is simply important that a device connected to a sensor on the implement be operative to detect transverse movement of the implement relative to a row being followed.

Thus there has been shown and described a row following drawn implement which accomplishes at least all of the stated objects.

We claim:

1. A row following drawn implement comprising, an implement frame, ground wheel support means on said frame, an elongated hitch arm having forward and rearward ends, said forward end having means for pivotal connection about a generally vertical axis to a drawbar of a towing vehicle, said hitch arm being pivotally connected to said frame for transverse pivotal movement of the hitch arm about a generally upright pivot axis adjacent said rearward end of said hitch arm, power means carried on said frame, said power means being actuatable to pivot said hitch arm about said pivot axis, said power means being housed substantially within the confines of said frame, row follower means carried on said implement and operative to sense transverse movement of the implement relative to a ground row, and said row follower means being operatively connected to said power means for actuating said power means to effect pivotal steering movement of said frame relative to said hitch arm in response to transverse movement of the implement relative to a ground row.

2. The implement of claim 1 wherein said implement frame includes an elongated transversely extended tool bar.

3. The implement of claim 2 wherein said power means comprises an extendable and retractable hydraulic cylinder.

4. The implement of claim 2 wherein said tool bar includes an elongated main tubing member and mounting means extended forwardly therefrom at a position generally centered on said tubing member, said hitch arm being pivotally connected to said mounting means whereby said pivot axis is situated forwardly of said main tubing member.

5. The implement of claim 4 wherein said power means comprises an extendable and retractable hydraulic cylinder.

6. The implement of claim 5 wherein said hydraulic cylinder is situated within said tubing member substantially parallel to the longitudinal axis thereof.

7. The implement of claim 1 further comprising ground wheel support means on said tool bar.

8. An agricultural row crop drawn implement comprising, an elongated transversely extended tool bar, an elongated hitch arm having forward and rearward ends, said forward end being adapted for connection to a tractor, said hitch arm being pivotally connected to said tool bar for transverse pivotal movement of the forward end of the hitch arm about a generally upright pivot axis adjacent said rearward end of said hitch arm, power means carried on said tool bar, said power means being actuatable to pivot said hitch arm about said pivot axis, said power means being housed substantially within the confines of said tool bar to avoid interference with the mounting of implements on said tool bar, row follower means carried on said implement and operative to sense transverse movement of the implement relative to a crop row, and said row follower means being operatively connected to said power means for actuating said power means to effect pivotal steering movement of said tool bar relative to said hitch arm in response to transverse movement of the implement relative to a crop row.

9. The implement of claim 8 further comprising ground wheel support means on said tool bar.

10. A row following drawn implement comprising, an implement frame, ground wheel support means on said frame, an elongated hitch arm having forward and rearward ends, said forward end having means for pivotal connection about a generally vertical axis to a drawbar of a towing vehicle, said hitch arm being pivotally connected to said frame for transverse pivotal movement of the hitch arm about a generally upright pivot axis adjacent said rearward end of said hitch arm, extendable and retractable linkage means interconnecting said hitch arm and frame, said linkage means being operative to pivot said hitch arm about said pivot axis, said linkage means being housed substantially with the confines of said frame, row follower means operatively associated with said implement and operative to sense transverse movement of the implement relative to a ground row, and said row follower means being operatively associated with said linkage means for extending and retracting said linkage means to effect pivotal steering movement of said frame relative to said hitch arm in response to transverse movement of the implement relative to a ground row.

11. A row following implement comprising, an implement frame, an elongated hitch arm having forward and rearward ends, said forward end being adapted for connection to a towing vehicle, said hitch arm being pivotally connected to said frame for transverse pivotal movement of the hitch arm about a generally upright pivot axis adjacent said rearward end of said hitch arm, power means carried on said frame, said power means being actuatable to pivot said hitch arm about said pivot axis, said power means being housed substantially within the confines of said frame, row follower means carried on said implement and operative to sense transverse movement of the implement relative to a ground row, and said row follower means being operatively connected to said power means for actuating said power means to effect pivotal steering movement of said frame relative to said hitch arm in response to transverse movement of the implement relative to a ground row, said pivot axis intersecting the hitch arm forwardly of the rearward end thereof, and said power means being connected to said hitch arm rearwardly of said pivot axis.

12. A row following implement comprising, an implement frame, an elongated hitch arm having forward and rearward ends, said forward end being adapted for connection to a towing vehicle, said hitch arm being pivotally connected to said frame for transverse pivotal movement of the hitch arm about a generally upright pivot axis adjacent said rearward end of said hitch arm, power means carried on said frame, said power means being actuatable to pivot said hitch arm about said pivot axis, said power means being housed substantially within the confines of said frame, row follower means carried on said implement and operative to sense transverse movement of the implement relative to a ground row, said row follower means being operatively connected to said power means for actuating said power means to effect pivotal steering movement of said frame relative to said hitch arm in response to transverse movement of the implement relative to a ground row, ground wheel support means on said tool bar, and a ground engaging stabilizer wheel and support means for supporting said stabilizer wheel relative to said frame for rotation about a transverse pivot axis at a position rearwardly of said frame.

13. The implement of claim 12 wherein said stabilizer wheel comprises a stabilizer disc.

14. An agricultural row crop implement comprising, an elongated transversely extended tool bar, an elongated hitch arm having forward and rearward ends, said forward end being adapted for connection to a tractor, said hitch arm being pivotally connected to said tool bar for transverse pivotal movement of the forward end of the hitch arm about a generally upright pivot axis adjacent said rearward end of said hitch arm, power means carried on said tool bar, said power means being actuatable to pivot said hitch arm about said pivot axis, said power means being housed substantially within the confines of said tool bar to avoid interference with the mounting of implements on said tool bar, row follower means carried on said implement and operative to sense transverse movement of the implement relative to a crop row, said row follower means being operatively connected to said power means for actuating said power means to effect pivotal steering movement of said tool bar relative to said hitch arm in response to transverse movement of the implement relative to a crop row, and said pivot axis intersecting the hitch arm forwardly of the rearward end thereof, said power means being connected to said hitch arm rearwardly of said pivot axis.

15. The implement of claim 14 wherein said power means comprises an extendable and retractable hydraulic cylinder.

16. The implement of claim 15 wherein said tool bar includes an elongated main tubing member and mounting means extended forwardly therefrom at a position generally centered on said tubing member, said hitch arm being pivotally connected to said mounting means whereby said pivot axis is situated forwardly of said main tubing member.

17. The implement of claim 16 wherein said hydraulic cylinder is situated within said tubing member substantially parallel to the longitudinal axis thereof.

18. An agricultural row crop implement comprising, an elongated transversely extended tool bar, an elongated hitch arm having forward and rearward ends, said forward end being adapted for connection to a tractor, said hitch arm being pivotally connected to said tool bar for transverse pivotal movement of the forward end of the hitch arm about a generally upright pivot axis adjacent said rearward end of said hitch arm, power means carried on said tool bar, said power means being actuatable to pivot said hitch arm about said pivot axis, said power means being housed substantially within the confines of said tool bar to avoid interference with the mounting of implements on said tool bar, row follower means carried on said implement and operative to sense transverse movement of the implement relative to a crop row, said row follower means being operatively connected to said power means for actuating said power means to effect pivotal steering movement of said tool bar relative to said hitch arm in response to transverse movement of the implement relative to a crop row, ground wheel support means on said tool bar, and a ground engaging stabilizer disc and support means for supporting said stabilizer disc for rotation about a transverse pivot axis at a position rearwardly of said tool bar.

* * * * *